Jan. 19, 1932.  A. JORDAHL  1,841,536
FILTER FOR GAS, AIR, AND THE LIKE
Filed Feb. 27, 1926

Inventor
Anders Jordahl
By his Attorney

Patented Jan. 19, 1932

1,841,536

UNITED STATES PATENT OFFICE

ANDERS JORDAHL, OF NEW YORK, N. Y., ASSIGNOR TO AMERICAN AIR FILTER COMPANY, INC., OF LOUISVILLE, KENTUCKY, A CORPORATION OF DELAWARE

FILTERS FOR GAS, AIR, AND THE LIKE

Application filed February 27, 1926. Serial No. 91,058.

This invention relates to air filters, and more particularly to air filters of the unit type in which the requisite number of independently removable filter cells or units are mounted or supported in a stationary frame structure. In the use of filters of this type, the dust is removed from the air or gas in its passage through the filter cells or units by impingement upon viscous coated baffling surfaces of a suitable filtering medium contained within each cell or unit. It has heretofore been necessary, after a comparatively short period of use of the filter cell to remove the cell from the filter installation and wash the accumulated dust from the filtering medium and then recharge the medium with the viscous fluid. This is due to the fact that as soon as the accumulated dust on the filter medium is of such quantity as to completely absorb the viscous liquid and practically cover the surfaces of the filter medium, the filter cell ceases to function satisfactorily because any additional dust superposed upon dust previously caught and held by the viscous liquid will be easily torn loose by the passing air currents and carried through the cell into the clean air duct.

It is the primary object and purpose of my present invention to provide a filter cell or unit having means incorporated as a part thereof for slowly supplying the viscous liquid as the quantity of dust accumulating on the surfaces of the filter medium increases so that the period of time during which the filter cell or unit will function efficiently before requiring washing and the removal of the accumulated dust may be appreciably extended or prolonged. In certain embodiments of the invention, the filter unit or cell may be conveniently provided with one or more holders or containers for the viscous liquid from which said liquid will be distributed over the surfaces of the filter medium contained in the cell. In other embodiments, I may incorporate within the body of the filtering medium, a number of wicks extending into the liquid holding reservoir of the cell from which the liquid will be drawn by capillary attraction, or I may provide a filtering medium in the form of expanded metal sheets to which one or more liquid delivering wicks are directly attached.

It is a further general object of my invention to provide an air filter cell or unit of the above character with means for automatically supplying the viscous liquid to the filter medium thereof, which will be simple and durable in its construction, and will not materially add to the present manufacturing cost of such filter units.

With the above and other objects in view, the invention consists in the improved filter for gas, air and the like, and in the form, construction and relative arrangement of its several parts as will be hereinafter more fully described, illustrated in the accompanying drawings, and subsequently incorporated in the subjoined claims.

In the drawings, wherein I have illustrated several simple and practical embodiments of the invention, and in which similar reference characters designate corresponding parts throughout the several views:—

Figure 1:
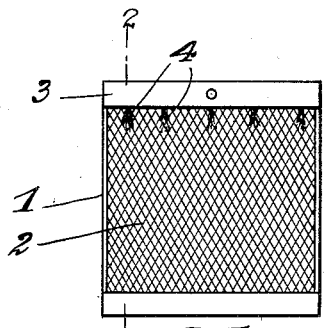
Figure 1 illustrates an air filter unit or cell provided with one embodiment of my present invention.
Figure 2:
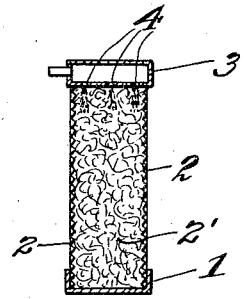
Fig. 2 is a sectional view thereof taken substantially on the line 2—2 of Fig. 1.

Referring in detail to the drawings, and more particularly to Figs. 1 and 2 thereof, 1 designates the rectangular frame structure of the filter unit or cell which has opposite open sides covered by the usual expanded metal sheets indicated at 2 and between which the filter medium 2' is compactly held. This filter medium may consist of various metallic materials now commonly used in the art which provides a compact mass having a more or less extensive aggregate surface area upon which the air currents may impinge and numerous tortuous passages through the mass permitting of the flow of the air currents with minimum resistance from the ingress to the egress side of the filter unit.

At the top of the frame 1 said frame is provided with a holder or reservoir 3 for a viscous liquid, the bottom wall of this reservoir having numerous holes or perforations 4 through which the liquid may flow by gravity and be distributed upon the numerous baffle surfaces of the filter medium 2'. Suitable means may be provided for supplying the liquid to the reservoir 3 so that after the filter unit has functioned for a predetermined length of time when the accumulations of dust on the filter medium will have substantially absorbed the liquid film on the surfaces thereof, the filter cell may be recharged with the viscous liquid without removing the same from the filter installation.

Figure 3:
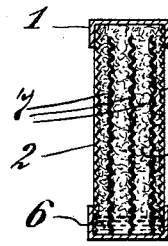
Figs. 3, 4 and 5 are sectional views similar to Fig. 2, illustrating various alternative embodiments of the invention.

In Fig. 3 of the drawings, I have shown another form of the invention, in which the filter cell or unit is provided at its bottom or lower end with the reservoir or holder 6 for the viscous liquid. One or more distributors 7 for the liquid contained in the reservoir 6 extends upwardly from said reservoir within the body of filtering medium. As illustrated, these distributors 7 may consist of wicks having their lower ends immersed in the liquid contained in the reservoir 6 so that the liquid is drawn upwardly by capillary attraction and constantly distributed over the accumulating dust layers on the surfaces of the filter medium. These distributors 7 might also consist of small rods or pipes extending into the liquid contained in the reservoir 6 so that the dust layer accumulating on the surfaces of these pipes will act by capillary attraction to distribute the liquid from said reservoir upon the contiguous surfaces of the filter medium.

Figure 5:
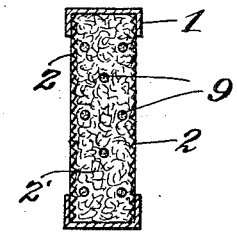

The wicks or distributors 7 may also be arranged horizontally within the body of the filtering medium as indicated at 9 in Fig. 5 of the drawings. In this case, these distributors are in the form of wicks of cotton, wool or similar substance which absorb the viscous liquid to the limit of saturation when the filter unit or cell is initially immersed in the liquid and charged therewith before mounting the same in the filter installation. By providing these horizontal wicks in sufficient number and properly spacing the same, the liquid will be automatically distributed therefrom by capillary attraction of the accumulating dust layers over the surfaces of the filter medium, thus enabling the filter unit or cell to function for a prolonged period of time before recharging of the same with the viscous liquid becomes necessary.

Figure 4:
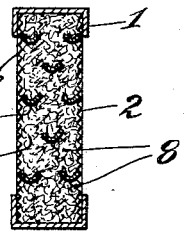

In Fig. 4 of the drawings, I have shown an arrangement of troughs or cups indicated at 8 which may be suitably incorporated in spaced relation to each other within the body of the filtering medium 2' which serve as small reservoirs receiving and holding a quantity of the viscous liquid when the filter cell in initially immersed therein and the filter medium charged.

Figure 6:
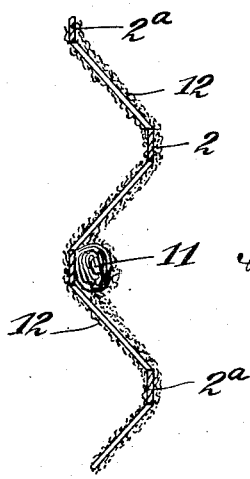
Fig. 6 is a fragmentary sectional view on an enlarged scale of an expanded metal filter element showing another embodiment of the invention.

In the use of such filter cells or units for certain purposes, it is common practice to employ in connection with the filtering medium 2' one or more sheets of the expanded metal 2ª as shown in Fig. 6 which may be similar to the opposite side walls 2' of the filter cell and to incorporate such expanded metal sheets within the mass of the filter medium in properly spaced relation to each other. These expanded metal sheets provide a convenient means for supporting the liquid distributing members within the body of the filtering medium, and as seen in Fig. 6, such distributors in the form of wicks as indicated at 11, may be directly attached to the expanded metal sheets so that the dust layer indicated at 12 which accumulates on the surfaces of the expanded metal and upon the wick will, by capillary attraction, be constantly wetted or covered with a film of the liquid so that further dust particles subsequently superimposed therein will be securely caught and held.

In the foregoing description, I have referred to several simple and practical embodiments of my present improvements, but it will be understood that the essential features thereof might also be incorporated in various other alternative structural forms, and I accordingly reserve the privilege of resorting to all such legitimate changes therein as may be fairly embodied within the spirit and scope of the invention as claimed.

What is claimed is:—

1. In an air filter, a frame having a compressed mass of air filtering material therein, and a reservoir directly associated with said compressed mass of material for discharging a viscous liquid at a plurality of points within the body of said mass and upon the surfaces of the material composing the same.

2. In an air filter, a compressed mass of filtering material, and a plurality of liquid holding reservoirs within the body of said mass sustained in spaced relation to each other and adapted to distribute liquid upon the surfaces of the material composing said mass.

3. In a filter, a compressed mass of non-absorbent air filtering material, and a plurality of liquid absorbing and distributing wicks incorporated in the body of said mass and sustained thereby in spaced relation to each other for distributing liquid films upon the surface of the material composing said mass.

In testimony whereof I affix my signature.

ANDERS JORDAHL.